US007925604B2

(12) United States Patent
Krauthgamer et al.

(10) Patent No.: US 7,925,604 B2
(45) Date of Patent: Apr. 12, 2011

(54) ADAPTIVE GREEDY METHOD FOR ORDERING INTERSECTING OF A GROUP OF LISTS INTO A LEFT-DEEP AND-TREE

(75) Inventors: Robert Krauthgamer, Albany, CA (US); Aranyak Mehta, San Jose, CA (US); Vijayshankar Raman, Sunnyvale, CA (US); Atri Rudra, Buffalo, NY (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 11/923,684

(22) Filed: Oct. 25, 2007

(65) Prior Publication Data

US 2009/0113309 A1 Apr. 30, 2009

(51) Int. Cl.
*G06F 17/10* (2006.01)
*G06F 17/30* (2006.01)

(52) U.S. Cl. ............ 706/45; 706/14; 707/763; 707/765; 707/796; 707/797

(58) Field of Classification Search ...................... 706/45
See application file for complete search history.

(56) References Cited

U.S. PATENT DOCUMENTS

| 5,809,219 | A | 9/1998 | Pearce et al. |
| 6,211,882 | B1 | 4/2001 | Pearce et al. |
| 7,120,301 | B2 | 10/2006 | Wenzel et al. |

OTHER PUBLICATIONS

Gupta et al., "Efficient Gathering of Correlated Data in Sensor Networks", MobiHoc'05, May 25-27, 2005.*

Eppstein, et al., "Sparsification—A Technique for Speeding Up Dynamic Graph Algorithms," Journal of the ACM, vol. 44, No. 5, Sep. 1997, pp. 669-696.
Gupta, et al., "Efficient Gathering of Correlated Data in Sensor Networks," MobiHoc' 05, ACM, May 25-27, 2005, pp. 402-413.
Long, et al., "Three-Level Caching for Efficient Query Processing in Large Web Search Engines," WWW 2005, ACM, May 10-14, 2005, pp. 257-266.
Aronov, et al, "Cost-Driven Octree Construction Schemes: An Experimental Study," SoCG' 03, ACM, Jun. 8-10, 2003, pp. 227-236.
Raghavan, et al., "A Rearrangeable Algorithm for the Construction of Delay-Construction of Delay-Constrained Dynamic Multicast Trees," IEEE/ACM Transactions on Networking, vol. 7, No. 4, Aug. 1999, pp. 514-529.

* cited by examiner

*Primary Examiner* — Donald Sparks
*Assistant Examiner* — Nathan H Brown, Jr.
(74) *Attorney, Agent, or Firm* — Gibb I.P. Law Firm, LLC

(57) ABSTRACT

The embodiments of the invention provide a method of ordering an intersecting of a group of lists into a left-deep AND-tree. The method begins by performing a first selecting process including selecting a top list, corresponding to a top leaf of the left-deep AND-tree, from the group of lists to leave remaining lists of the group of lists. The top list can be the smallest list of the group of lists. The method can also select a pair of lists from the group of lists, such that the pair of lists has the smallest intersection size relative to other pairs of lists of the group of lists. Next, the method estimates intersections of the remaining lists with the top list by estimating an amount of intersection between the remaining lists and the top list. This involves sampling a portion of the remaining lists. The method also includes identifying larger list pairs having smaller intersections sizes when compared to smaller list pairs having larger intersections sizes.

20 Claims, 2 Drawing Sheets

ADAPTIVE GREEDY METHOD FOR ORDERING INTERSECTING OF A GROUP OF LISTS INTO A LEFT-DEEP AND-TREE

BACKGROUND

1. Field of the Invention

The embodiments of the invention provide an adaptive greedy method for fast list intersection via sampling.

2. Description of the Related Art

Within this application several publications are referenced by Arabic numerals within brackets. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Correlation is a persistent problem for the query processors of database systems. Over the years, many have observed that the standard System-R assumption of independent attribute-value selections does not hold in practice, and have proposed various techniques towards addressing this (e.g., [8]).

Nevertheless, query optimization is still an unsolved problem when the data is correlated, for two reasons. First, the multidimensional histograms and other synopsis structures used to store correlation statistics have a combinatorial explosion with the number of columns, and so are very expensive to construct as well as maintain. Second, even if the correlation statistics were available, using correlation information in a correct way requires the optimizer to do an expensive numerical procedure that optimizes for maximum entropy [10]. As a result, most database implementations still rely heavily on independence assumptions.

One area where correlation is particularly problematic is for semijoin operations that are used to answer conjunctive queries over large databases. In these operations, one separately computes the set of objects matching each predicate, and then intersects these sets to find the objects matching the conjunction. Examples of star joins, scans in column stores, and a key word search are provided.

In regards to star joins, the following query analyzes coffee sales in California by joining a fact table Orders with multiple dimension tables:

SELECT S.city, SUM(O.quantity), COUNT(E.name)
FROM orders O, cust C, store S, product P, employee E
WHERE O.cId=C.id and O.sId=S.id and O.pId=P.id and
  O.empId=e.id C.age=65, S.state=CA, P.type=COFFEE,
  E.type=TEMP
GROUP BY S.city Many DBMSs would answer this query by first intersecting 4 lists of row ids (RIDs), each built using a corresponding index:

$L_1$={Orders.id|Orders.cId=Cust.id,Cust.age=65}, $L_2$={Orders.id|Orders.sId=Store.id,Store.state= CA},...;

and then fetching and aggregating the rows corresponding to the RIDs in $L_1 \cap L_2 \cap \ldots$.

In regards to scans in column stores, recently there has been a spurt of interest in column stores (e.g, [15]). These would store a schema like the above as a denormalized "universal relation", decomposed into separate columns for type, state, age, quantity, and so on. A column store does not store a RID with these decomposed columns; the columns are all sorted by RID, so the RID for a value is indicated by its position in the column. To answer the previous example query, a column store will use its columns to find the list of matching RIDs for each predicate, and then intersect the RID-lists.

In regards to the keyword search, a query for ("query" and ("optimisation" or "optimization")) is provided against a search engine. It is typically processed as follows. First, each keyword is separately looked up in an (inverted list) index to find 3 lists $L_{query}$, $L_{optimisation}$, and $L_{optimization}$ of matching document ids, and the second and third lists are merged into one sorted list. Next, the two remaining lists are intersected and the ids are used to fetch URLs and document summaries for display.

The intersection is often done via an AND-tree, a binary tree whose leaves are the input lists and whose internal nodes represent intersection operators. The performance of this intersection depends on the ordering of the lists within the tree. Intuitively, it is more efficient to form smaller intersections early in the tree, by intersecting together smaller lists or lists that have fewer elements in common.

Correlation is problematic for this intersection because the intersection sizes can no longer be estimated by multiplying together the selectivities of individual predicates.

The most common implementation of list intersection in data warehouses, column stores, and search engines, uses left-deep AND-trees where the k input lists $L_1, L_2, \ldots L_k$ are arranged by increasing (estimated) size from bottom to top (in the tree). The intuition is to form smaller intersections earlier in the tree. However, this method may perform poorly when the predicates are correlated, because a pair of large lists may have a smaller intersection than a pair of small lists. Correlation is a well known problem in databases and there is empirical evidence that correlation can result in cardinality estimates being wrong by many orders of magnitude, see e.g. [14, 8].

An alternative implementation proposed by Demaine et al [5] is a round-robin intersection that works on sorted lists. It starts with an element from one list, and looks for a match in the next list. If none is found, it continues in a roundrobin fashion, with the next higher element from this second list. This is an extension to k lists of a comparison-based process that computes the intersection of two lists via an alternating sequence of doubling searches.

Neither of these two solutions is really satisfying. The first is obviously vulnerable to correlations. The second is guaranteed to be no worse than a factor of k from the best possible intersection (informally, because the method operates in round-robin fashion, once in k tries it has to find a good list). But in many common inputs it actually performs a factor k worse than a naive left-deep AND-tree. For example, suppose the predicates were completely independent and selected rows with probabilities $p_1 \leq p_2 \leq \ldots \leq p_k$, and suppose further that $\{p_j\}$ forms (or is dominated by) a geometric sequence bounded by say ½. For a domain with N elements, an AND-tree that orders the lists by increasing size would take time $O(N(p_1+p_1p_2+ \ldots +p_1p_2 \ldots p_{k-1}))=o(_p_1n)$, while the round-robin intersection would take time proportional to $$Nk \bigg/ \left(\frac{1}{p_1} + \cdots + \frac{1}{p_k}\right) = \Omega(kp_1N).$$

This behavior was also experimentally observed in [6].

The round-robin method also has two practical limitations. First, it performs simultaneous random accesses to k lists. Second, these accesses are inherently serial and thus have to be low-latency operations. In contrast, a left-deep AND-tree accesses only two lists at a time, and a straightforward implementation of it requires random accesses to only one list. Even here, a considerable speedup is possible by dispatching a large batch of random accesses in parallel. This is especially useful when the lists are stored on a disk-array, or at remote data sources.

Tree-based RID-list intersection has been used in query processors for a long time. Among the earliest to use the greedy method of ordering by list size was [11], who proposed the use of an AND-tree for accessing a single table using multiple indexes.

Round-robin intersection methods first arose in the context of AND queries in search engines. Demaine et al [5] introduced and analyzed a round-robin set-intersection method that is based on a sequence of doubling searches. Subsequently, Barbay et al [2] have generalized the analysis of this method to a different cost-model. Heuristic improvements of this method were studied experimentally on Google query logs in [6, 3]. A probabilistic version of this round-robin method was used by Raman et al [13] for RID-list intersection.

In XML databases, RID-list intersection is used in finding all the matching occurrences for a twig pattern, whose selection predicates apply to multiple elements related by an XML tree structure. [4] proposed a holistic twig join method, TwigStack, for matching an XML twig pattern. IBM's DB2 XML has implemented a similar method for its XANDOR operator [1]. TwigStack is similar to round-robin intersection, navigating around the legs for results matching a pattern.

A related but different problem, studied by Munagala et al [12], is the pipelined filters problem, which is a variant of the Min-Sum Set-Cover (MSSC). In this variant, a single list $L_0$ is given as the "stream" from which tuples are being generated. Predicates are evaluated by scanning this stream, so they can be treated as lists that support only a contains( ) interface that runs in $O(1)$ time. The job of the pipelined filters method is to choose an ordering of these other lists. [12] apply previous work by Feige, Lovász and Tetali [7] on MSSC, by treating the complements of these lists as sets in a set covering. They show that the greedy set cover heuristic is a 4-approximation for this problem, and also study the online case (where $L_0$ is a stream of unknown tuples).

The difference between this problem and the general list intersection problem is that a method for pipelined filters is restricted to use a particular $L_0$, and apply the other predicates via contains( ) only. Hence, every method has to inspect every element in the universe at least once. In this context, this would be no better than doing a table scan on the entire fact table, and applying the predicates on each row. Another difference is in the access to the lists—this setting accommodates sampling and hence estimation of (certain) conditional selectivities, which is not possible in the online (streaming) scenario of [12], where it would correspond to sampling from future tuples. Finally, the pipeline of filters corresponds to a left-deep AND-tree, while this model allows arbitrary AND-trees; for example, one can form separate lists for say age=65 and type=COFFEE, and intersect them, rather than applying each of these predicates one by one on a possibly much larger list.

SUMMARY

A common technique for processing conjunctive queries is to first match each predicate separately using an index lookup, and then compute the intersection of the resulting row-id lists, via an AND-tree. The performance of this technique depends on the order of lists in this tree: the intersections that will produce small results are computed early. But this optimization is hard to do when the data or predicates have correlation. Thus, a method for ordering the lists in an AND-tree by sampling the intermediate intersection sizes is presented.

The embodiments of the invention provide a method of intersecting a group of lists. The method begins by performing a first selecting process including selecting a top list from the group of lists to leave remaining lists. The top list can be the smallest list of the group of lists. The method can also select a pair of lists from the group of lists, such that the pair of lists has the smallest intersection size relative to other pairs of lists of the group of lists. Next, the method estimates intersections of the remaining lists with the top list by estimating an amount of intersection between the remaining lists and the top list. This involves sampling a portion of the remaining lists. The method also includes identifying larger list pairs having smaller intersections sizes when compared to smaller list pairs having larger intersections sizes.

Following this, the method performs a second selecting process including selecting a worst-case list from the remaining lists that has the smallest amount of intersection shown by the above estimation. This includes ordering the remaining lists in a binary tree such that leaves of the binary tree represent the remaining lists, internal nodes of the binary tree represent intersection operators, every right child is a leaf, and such that the binary tree represents a linear ordering of the remaining lists.

The method then intersects the top list and the worst-case list; and, removes the worst-case list from the remaining lists to produce updated remaining lists. The method repeats the estimating, the performing of the second selecting process, the intersecting, and the removing using the updated remaining lists iteratively until all lists within the group of lists have been processed. This produces a list of intersections, which are subsequently output to a user in response to the user's conjunctive query.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
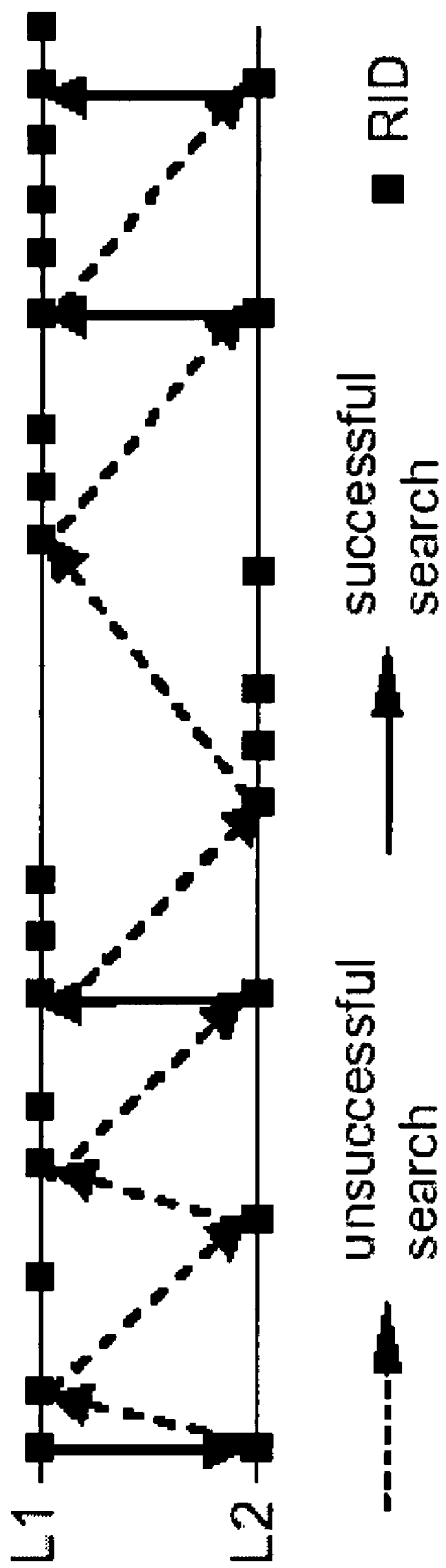
FIG. 1 illustrates an alternating sequence of doubling searches.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

A common technique for processing conjunctive queries is to first match each predicate separately using an index lookup, and then compute the intersection of the resulting row-id lists, via an AND-tree. The performance of this technique depends on the order of lists in this tree: the intersections that will produce small results are computed early. But this optimization is hard to do when the data or predicates have correlation. Thus, a method for ordering the lists in an AND-tree by sampling the intermediate intersection sizes is presented.

The analysis of the adaptive greedy method herein uses techniques from the field of Approximation Methods. In particular, a connection to a different optimization problem, called the Min-Sum Set-Cover (MSSC) problem, is exploited. In particular, previous work of Feige, Lovász and Tetali [7], who proved that the greedy method achieves 4-approximation for this problem, is relied on.

The embodiments of the invention provide an adaptive greedy method for list intersections that solves the correlation problem. The lists are ordered not by their marginal (singlepredicate) selectivities, but rather by their conditional selectivities with respect to the portion of the intersection that has already been computed. The methods herein have strong theoretical guarantees on its worst case performance. A sampling procedure is also provided that computes these conditional selectivities at query run time, so that no enhancement needs to be made to the optimizer statistics.

The list intersection method builds on top of a basic infrastructure: the access method interface provided by the lists being intersected. The capability of this interface determines the cost model for intersection.

The lists being intersected are specified in terms of tables and predicates over the tables, such as $L_1=\{Orders.id|Orders.cId=Cust.id, Cust.age=65\}$. The elements in each such list are accessed via two kinds of operations. The first operation, iterate( ), is an ability to iterate through the elements of the list in pipelined fashion. The second operation, contains(rid), looks up into the list for occurrence of the specified RID.

These two basic routines can be implemented in a variety of ways. One could retrieve and materialize all matching RIDs in a hash table so that subsequent contains( ) is fast.

Or, one could implement contains( ) via a direct lookup into the fact table to retrieve the matching row, and evaluate the predicate directly over that row.

Given this basic list interface, an intersection method is implemented as a tree of pairwise intersection operators over the lists. The cost (running time) of this AND-tree is the sum of the costs of the pairwise intersection operators in the tree.

The cost of intersecting two lists $L_{small}$, $L_{large}$ is modeled (assuming wlog that $|L_{small}| \leq |L_{large}|$) as $\min\{|L_{small}|, |L_{large}|\}$. This cost model matches a variety of implementation, that all follow the pattern of—for each element x in $L_{small}$ check if $L_{large}$ contains x. Here, $L_{small}$ has to support an iterator interface, while $L_{large}$ need only support a contains( ) operation that runs in constant time.

Under this cost model, the optimal AND tree is always a left-deep tree. Thus, $L_{small}$ has to be formed explicitly only for the leftmost leaf; it is available in a pipelined fashion at all higher tree levels.

In the data warehouse example, $L_{small}$ is formed by index lookups, such as on Cust.age to find {Cust.id|age=65}, and then for each id x therein, lookup an index on Orders.cId to find {Orders.id|cId=x}. $L_{large}$ needs to support contains( ), and can be implemented in two ways. First, $L_{large}$ can be formed explicitly as described for $L_{small}$, and then built into a hash table. Second, $L_{large}$.contains( ) can be implemented without forming $L_{large}$, via index lookups: to check if a RID is contained in say $L_2=\{Orders.id|O.sId=Store.id$ and $Store.state=CA\}$, just fetching the corresponding row (by a lookup into the index on Orders.id and then into Store.id) and evaluate the predicate.

A new method that orders the lists into a left-deep AND-tree, dynamically, in a greedy manner is provided. Denoting the input k lists by $L=\{L_1, L_2, \ldots, L_k\}$, the greedy method chooses lists $G_0, G_1, \ldots$ as follows. First, initialization starts with a list of smallest size $G_0=\mathrm{argmin}_{L_j \in L}|L_j|$. Next, iteratively for $i=1, 2, \ldots$, assuming the intersection $G_0 \cap G_1 \cap \ldots \cap G_{i-1}$ was already computed, the next list $G_i$ to intersect with is chosen, such that the (estimated) size of $|(G_0 \cap G_1 \cap \ldots G_{i-1}) \cap (G_i)|$ is minimized.

It is initially assumed that perfectly accurate intersection size estimates are available. As discussed more fully below, an estimation procedure is provided that approximates the intersection size, and analyze the effect of this approximation on the performance guarantees.

One advantage of this greedy method is its simplicity. It uses a left-deep AND-tree structure, similarly to what is currently implemented in most database systems. The AND-tree is determined only on-the-fly as the intersection proceeds. But this style of progresively building a plan fits well in current query processors, as demonstrated by systems like Progressive Optimization [9].

An advantage of this greedy method is that it attains worst-case performance guarantees. For an input instance L, let GREEDY(L) denote the cost incurred by the above greedy method on this instance, and let OPT(L) be the minimum possible cost incurred by any AND-tree on this instance. The following theorem results:

Theorem 2.1. In the Min-Size cost model, the performance of the greedy method is always within factor of 8 of the optimum, i.e., for every instance L, GREEDY(L)$\leq$8. OPT(L). Further, it is NP-hard to find an ordering of the lists that would give performance within factor better than 5/2 of the optimum (even if the size of every intersection can be computed).

It is assumed that perfectly accurate intersection size estimates are available to the greedy method. A procedure is used that estimates the intersection size within small absolute error, and provide rigorous analysis to show that it is sufficiently effective for the performance guarantees derived in the previous sections. As seen in Theorem 3.4, below, the total cost (running time) of computing the intersection estimates is polynomial in k, the number of lists (which is expected to be small), and completely independent of the list sizes (which are typically large).

Proposition 3.1. There is a randomized procedure that gets as input 0<$\epsilon$, $\delta$<1 and two lists, namely a list A that supports access to a random element, and a list B that supports the operation contains( ) in constant time; and produces in time $$O\left(\frac{1}{\varepsilon^2}\log\frac{1}{\delta}\right)$$

an estimate s such that $Pr[s=|A\cap B|\pm\varepsilon|A|]\geq 1-\delta.$

The estimation procedure works as follows. First, $$t = \frac{64}{\varepsilon^2}\log\frac{1}{\delta}$$

elements are independently chosen from A. Second, the number s' of these elements that belong to B is computed. Next, the estimate $$s = \frac{s'}{t}\cdot|A|$$

is reported. The proof of the statement is a straightforward application of Chernoff bounds.

In practice, the sampling step 1 can be done either by materializing the list A and choosing elements from it, or by scanning a pre-computed sample of the fact table and choosing elements that belong to A.

In this setting, the absolute error of Proposition 3.1 actually translates to a relative error. This relative error does not pertain to the intersection, but rather to its complement, as seen in the statement of the following proposition. Indeed, this is the form which is required to extend the analysis of Theorem 2.1.

Proposition 3.2. Let $L=\{L_1, \ldots, L_k\}$ be an instance of the list intersection problem, and denote $I=L_1 \cap L_2 \ldots \cap L_j$. If $|I \cap L_m|$ is estimated using Proposition 3.1 for each $m\in\{j+1, \ldots, k\}$ and $m^*$ is the index yielding the smallest such estimate, then $|I\backslash L_{m^*}|\geq(1-2k\varepsilon)\max_m|I\backslash L_m|$.

For $m\in\{j+1, \ldots, k\}$, the estimate for $|I\cap L_m|$ naturally implies an estimate for $I\backslash L_m$, which is denoted by $s_m$. By the accuracy guarantee, for all such m $s_m=|I\backslash L_m|\pm\varepsilon|I|.$ (1)

Let $m_0$ be the index that really maximizes $|I\backslash L_m|$. Let $m^*$ be the index yielding the smallest estimate for $|I\cap L_m|$, i.e., the largest estimate for $|I\backslash L_m|$. Thus, $s_{m^*}\geq s_{m_0}$, and using the accuracy guarantee (1) it is deduced that $|I\backslash L_{m^*}|\geq s_{m^*}-\varepsilon|I|\geq s_{m_0}-\varepsilon|I|\geq|I\backslash L_{m_0}|2\varepsilon|I|.$ (2)

The following lemma helps complete the proof of the proposition.

Lemma 3.3. There exists $m\in\{j+1, \ldots, k\}$ such that $|I\backslash L_m|\geq|I|/k$.

Recall that $\cap_i L_i=\emptyset$. Thus, every element in I does not belong to at least one list among $L_j+1, \ldots, L_k$, i.e., $I\subseteq\cup_{m=j+1}^{k}(I\backslash L_m)$. By averaging, at least one of these lists $I\backslash L_m$ must have size at least $|I|/(k-j)$.

Using Lemma 3.3, it is known that $|I\backslash L_{m_0}|\geq|I|/k$, and together it is concluded, as required, that $|I\backslash L_{m^*}|\geq|I\backslash L_{m_0}|-2\varepsilon|I|\geq|I\backslash L_{m_0}|\cdot(1-2k\varepsilon)$. This completes the proof of Proposition 3.2.

A careful inspection of the proof of Theorem 2.1 reveals that the performance guarantees continue to hold, with slightly worse constants, if the greedy method chooses the next list to intersect with using a constant approximation to the intersection sizes. Specifically, suppose that for some $0<\alpha<1$, the greedy method chooses lists $G_0, G_1, \ldots$ (in this order), and that at each step j, the list $G_j$ is only factor $\alpha$ approximately optimal in the following sense (notice that the factor $\alpha$ pertains not to the intersection, but rather to the complement):

$$|(G_0 \cap \cdots \cap G_{j-1})\backslash G_j| \geq \alpha\cdot\max_{L\in\mathcal{L}}|(G_0 \cap \cdots \cap G_{j-1})\backslash L|.$$ (3)

Note that $\alpha=1$ corresponds to an exact estimation of the intersections, and the proof of Theorem 2.1 holds. For general $\alpha>0$, an inspection of the proof shows that the performance guarantee of Theorem 2.1 increases by a factor of at most $1/\alpha$.

From Proposition 3.2, choosing the parameter $\varepsilon$ (of the estimation procedure) to be of the order of $1/k$ gives a constant factor approximation of the above form. Choosing the other parameter $\delta$ carefully gives the following:

Theorem 3.4. Let every intersection estimate used in the greedy method on input L be computed using Proposition 3.1 with $\varepsilon\leq 1/(8k)$ and $\delta\leq 1/k^2$.
(a) The total cost (running time) of computing intersection estimates is at most $O(k^4 \log k)$, independently of the list sizes.
(b) With high probability, the bounds in Theorem 2.1 hold with larger constants.

Part (a) is immediate from Proposition 3.1, since the greedy method performs at most k iterations, each requiring at most k intersection estimates. It thus remains to prove (b).

For simplicity, it is first assumed that the input instance $L=\{L_1, \ldots, L_k\}$ satisfies $\cap_i L_i=\emptyset$. By Propositions 3.2 and a choice of $\varepsilon$ and $\delta$, it is given that, with high probability, every list $G_j$ chosen by greedy at step j is factor $\frac{1}{2}$ approximately optimal in the sense of (3). It is enough that each estimate has, say, accuracy parameter $\varepsilon=1/(8k)$ and confidence parameter $\delta=1/k^2$.

A general input L is considered and $I^*=\cap_i L_i$ denoted. The iterations are partitioned into two groups, and deal with each group separately. Let $j'\geq 1$ be the smallest value such that $|G_0 \cap G_1 \cap \ldots \cap G_{j'}|\leq 2|I^*|$. For iterations $j=1, \ldots, j'-1$ (if any) an argument can essentially be applied similar to Proposition 3.2: the elements in $I^*$ are just ignored, which are less than half the elements in $I=G_0 \cap G_1 \cap \ldots \cap G_j$, and hence the term $1-2k\varepsilon$ should only be replaced by $14k\varepsilon$; as argued above, it can be shown that the method chooses a list that is O(1)-approximately optimal.

For iterations $j=j', \ldots, k-1$ (if any), the cost of the method are compared with that of a greedy method that would have had perfectly accurate estimates: the method has cost at most $O(|I^*|)$ per iteration, regardless of the accuracy of its intersection estimates, while if the estimates were perfectly accurate, would still cost at least $|I|\geq|I^*|$ per iteration; hence, the possibly inaccurate estimates can increase the upper bounds by at most a constant factor.

An alternative cost model is proposed by [5], which assumes that all the lists to be intersected have already been sorted. The column store example, above, fits well into this model, because every column is kept sorted by RID.

On the other hand, this model is not valid in the data warehouse scenario because the lists are formed by separate index lookups for each matching dimension key. E.g., the list of RIDs matching Cust.age=65 is formed by separate lookups into the index on Orders.cId for each Cust.id|age=65. The result of each lookup is individually sorted on RID, but the overall list is not.

In this model, the cost of intersecting two lists $L_1$, $L_2$ is the minimum number of comparisons needed to "certify" the intersection. This model assumes that both lists are already sorted by RID. Then, the intersection is computed by an alternating sequence of doubling searches (see FIG. 1 for illustration), wherein the values that are powers of two away from where the last search terminated are observed, and wherein a final binary search is conducted. This cost is approximated as O(1). The intersection computation starts at the beginning of $L_1$. Second, the next element in $L_1$ is taken and a doubling search is performed for a match in $L_2$. Next, the immediately next (higher) element of $L_2$ is taken and a search for a match in $L_1$ is performed. Following this, the second step is repeated.

The number of searches made by this method could sometimes be as small as $|L_1 \cap L_2|$, and at other times as large as $2 \min\{|L_1|, |L_2|\}$, depending on the "structure" of the lists (again approximating the cost of a doubling search as a constant).

Demaine et al [5] and Barbay and Kenyon [2] have analyzed a method that is similar to the above, but runs in a round-robin fashion over the k input lists. Their cost model counts comparisons, and they show that the worstcase running time of this method is always within a factor of O(k) of the smallest number of comparisons needed to certify the intersection. They also show that a factor of $\Omega(k)$ is necessary: there exists a family of inputs, for which no deterministic or randomized method can compute the intersection in less than k times the number of comparisons in the intersection certificate.

For the Comparisons model, the greedy method is within a constant factor of the optimum plus the size of the smallest list, $l_{min} = |G0| = \min_{L \in L} |L|$; namely, for every instance L, $GREEDY(L) \leq 8 \cdot OPT(L) + 16 \, l_{min}$. The factor (k) lower bound of Barbay and Kenyon [2] is gotten around by restricting OPT to be an AND-tree, and by allowing an additive cost based on $l_{min}$ (but independent of k). The above bound is the best possible, up to constant factors, since there are instances L for which $OPT(L) = O(1)$ and $GREEDY(L) \geq (1-o(1)) \, l_{min}$. This instance shows that with the limited lookahead (information about potential intersections), paying $\Omega(l_{min})$ is essentially unavoidable, regardless of OPT(L).

Theorem 4.1. In the comparison cost model, the performance of the greedy method is always within factor of 8 of the optimum (with an additive factor), i.e., for every instance L, $GREEDY(L) \leq 8 OPT(L) + 16 \, l_{min}$, where $l_{min}$ is length of the smallest input list. Further, there is a family of instances L for which $GREEDY(L) \geq (1-o(1)) (OPT(L) + l_{min})$.

The optimum AND-tree for the Min-Size model need not be optimal for the Comparison model and vice versa. Moreover, if only estimates of intersection sizes (using Proposition 3.1) are given, the theoretical bounds hold, with slightly worse constants.

A simple greedy method is provided for the list intersection problem. The method is similar in spirit to the most commonly used heuristic, which orders lists in a left-deep AND-tree in order of increasing (estimated) size. But in contrast, the method does have provably good worst-case performance, and much greater resilience to correlations between lists. In fact, the intuitive qualities of that common heuristic can be explained (and even quantified analytically) via the analysis: if the lists are not correlated, then list size is a good proxy for intersection size, and hence the analysis still holds.

A common technique for processing conjunctive queries is to first match each predicate separately using an index lookup, and then compute the intersection of the resulting row-id lists, via an AND-tree. The performance of this technique depends on the order of lists in this tree: the intersections that will produce small results are computed early. But this optimization is hard to do when the data or predicates have correlation. Thus, a method for ordering the lists in an AND-tree by sampling the intermediate intersection sizes is presented.

Figure 2:
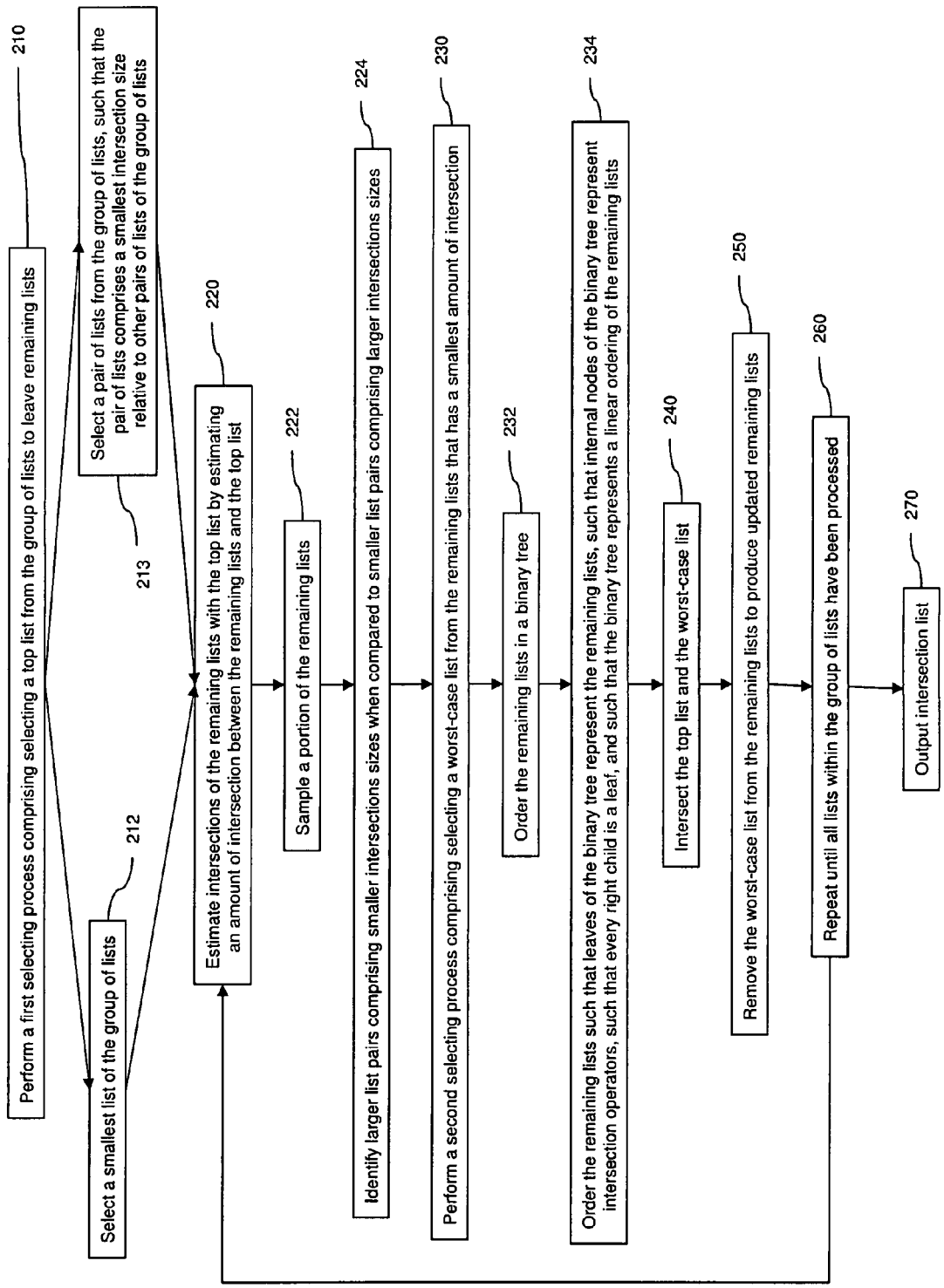
FIG. 2 is a flow diagram illustrating a method of intersecting a group of lists.

FIG. 2 is a flow diagram illustrating a method 200 of intersecting a group of lists. The method begins in item 210 by performing a first selecting process including selecting a top list from the group of lists to leave remaining lists. The top list can be the smallest list of the group of lists (item 212). The method can also select a pair of lists from the group of lists, such that the pair of lists has the smallest intersection size relative to other pairs of lists of the group of lists (item 213). Next, in item 220, the method estimates intersections of the remaining lists with the top list by estimating an amount of intersection between the remaining lists and the top list. This involves, in item 222, sampling a portion of the remaining lists. The method also includes, in item 224, identifying larger list pairs having smaller intersections sizes when compared to smaller list pairs having larger intersections sizes.

Following this, in item 230, the method performs a second selecting process including selecting a worst-case list from the remaining lists that has a smallest amount of intersection based on the foregoing estimation (item 220). This includes ordering the remaining lists in a binary tree (item 232) such that leaves of the binary tree represent the remaining lists, internal nodes of the binary tree represent intersection operators, every right child is a leaf, and such that the binary tree represents a linear ordering of the remaining lists (item 234).

Subsequently, the method intersects the top list and the worst-case list (item 240); and, removes the worst-case list from the remaining lists to produce updated remaining lists (item 250). In item 260, the method repeats the estimating, the performing of the second selecting process, the intersecting, and the removing using the updated remaining lists iteratively until all lists within the group of lists have been processed to produce a list of intersections. The list (or lists) of intersections are then output to a user in item 270.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

REFERENCES

[1] A. Balmin, T. Eliaz, J. Hornibrook, L. Lim, G. M. Lohman, D. Simmen, M. Wang, and C. Zhang. Cost-based optimization in DB2 XML. *IBM Systems Journal*, 45 (2), 2006.

[2] J. Barbay and C. Kenyon. Adaptive intersection and threshold problems. In *SODA*, 2002.

[3] J. Barbay, A. López-Ortiz, and T. Lu. Faster adaptive set intersections for text searching. In *Intl. Workshop on Experimental Algorithms*, 2006.

[4] N. Bruno, N. Koudas, and D. Srivastava. Holistic twig joins: Optimal XML pattern matching. In *SIGMOD*, 2002.

[5] E. D. Demaine, A. López-Ortiz, and J. I. Munro. Adaptive set intersections, unions, and differences. In 11*th Annual ACM-SIAM Symposium on Discrete Algorithms*, 2000.

[6] E. D. Demaine, A. López-Ortiz, and J. I. Munro. Experiments on adaptive set intersections for text retrieval systems. In 3*rd International Workshop on Algorithm Engineering and Experimentation (ALENEX)*, 2001.

[7] U. Feige, L. Lovász, and P. Tetali. Approximating min sum set cover. *Algorithmica*, 40 (4):219-234, 2004.

[8] I. Ilyas et al. CORDS: automatic discovery of correlations and soft functional dependencies. In *SIGMOD*, 2004.

[9] V. Markl et al. Robust Query Processing through Progressive Optimization. In *SIGMOD*, 2004.

[10] V. Markl et al. Consistent selectivity estimation using maximum entropy. *The VLDB Journal*, 16, 2007.

[11] C. Mohan et al. Single table access using multiple indexes: Optimization, execution, and concurrency control techniques. In *EDBT*, 1990.

[12] K. Munagala, S. Babu, R. Motwani, and J. Widom. The pipelined set cover problem. In 10*th International Conference on Database Theory (ICDT)*, 2005.

[13] V. Raman, L. Qiao, et al. Lazy adaptive rid-list intersection and application to starjoins. In *SIGMOD*, 2007.

[14] M. Stillger, G. Lohman, V. Markl, and M. Kandil. LEO: DB2's LEarning Optimizer. In *VLDB*, 2001.

[15] M. Stonebraker et al. C-store: A column-oriented dbms. In *VLDB*, 2005.

What is claimed is:

1. A computer-implemented method of ordering an intersecting of a group of lists into a left-deep AND-tree, said method comprising:
    performing, by a computer, a first selecting process comprising selecting a top list, corresponding to a top leaf of said left-deep AND-tree, from said group of lists to leave remaining lists of said group of lists;
    estimating, by said computer, intersections of said remaining lists with said top list by estimating an amount of intersection between said remaining lists and said top list;
    performing, by said computer, a second selecting process comprising selecting a worst-case list from said remaining lists that has a smallest amount of intersection, based on said estimating;
    intersecting, by said computer, said top list and said worst-case list;
    removing, by said computer, said worst-case list from said remaining lists to produce updated remaining lists;
    repeating, by said computer, said estimating, said performing of said second selecting process, said intersecting, and said removing using said updated remaining lists iteratively until all lists within said group of lists have been processed to produce a list of intersections; and
    outputting, by said computer, said list of intersections.

2. The method according to claim 1, wherein said estimating of said intersections comprises sampling a portion of said remaining lists.

3. The method according to claim 1, further comprising identifying larger list pairs comprising smaller intersections sizes when compared to smaller list pairs comprising larger intersections sizes.

4. The method according to claim 1, wherein said selecting of said top list comprises selecting a smallest list of said group of lists.

5. The method according to claim 1, wherein said selecting of said top list comprises selecting a pair of lists from said group of lists, such that said pair of lists comprises a smallest intersection size relative to other pairs of lists of said group of lists.

6. A computer-implemented method of ordering an intersecting of a group of lists into a left-deep AND-tree, said method comprising:
    performing, by a computer, a first selecting process comprising selecting a top list, corresponding to a top leaf of said left-deep AND-tree, from said group of lists to leave remaining lists of said group of lists;
    estimating, by said computer, intersections of said remaining lists with said top list by estimating an amount of intersection between said remaining lists and said top list;
    performing, by said computer, a second selecting process comprising selecting a worst-case list from said remaining lists that has a smallest amount of intersection, based on said estimating;
    intersecting, by said computer, said top list and said worst-case list;
    removing, by said computer, said worst-case list from said remaining lists to produce updated remaining lists;
    repeating, by said computer, said estimating, said performing of said second selecting process, said intersecting, and said removing using said updated remaining lists iteratively until all lists within said group of lists have been processed to produce a list of intersections; and
    outputting, by said computer, said list of intersections,
        wherein said performing of said second selecting process comprises ordering said remaining lists in a binary AND-tree.

7. The method according to claim 6 wherein said ordering of said remaining lists in said binary AND-tree comprises ordering said remaining lists such that leaves of said binary AND-tree represent said remaining lists, such that internal nodes of said binary AND-tree represent intersection operators, such that every right child is a leaf, and such that said binary AND-tree represents a linear ordering of said remaining lists.

8. A computer-implemented method of ordering an intersecting of a group of lists into a left-deep AND-tree, said method comprising:
    performing, by a computer, a first selecting process comprising selecting a top list, corresponding to a top leaf of said left-deep AND-tree, from said group of lists to leave remaining lists of said group of lists, wherein said top list comprises a smallest list of said lists;
    estimating, by said computer, intersections of said remaining lists with said top list by estimating an amount of intersection between said remaining lists and said top list;
    performing, by said computer, a second selecting process comprising selecting a worst-case list from said remaining lists that has a smallest amount of intersection based on said estimating;
    intersecting, by said computer, said top list and said worst-case list;
    removing, by said computer, said worst-case list from said remaining lists to produce updated remaining lists;
    repeating, by said computer, said estimating, said performing of said second selecting process, said intersecting, and said removing using said updated remaining lists iteratively until all lists within said group of lists have been processed to produce a list of intersections; and
    outputting, by said computer, said list of intersections.

9. The method according to claim 8, wherein said estimating of said intersections comprises sampling a portion of said remaining lists.

10. The method according to claim 8, further comprising identifying larger list pairs comprising smaller intersections sizes when compared to smaller list pairs comprising larger intersections sizes.

11. A computer-implemented method of ordering an intersecting of a group of lists into a left-deep AND-tree, said method comprising:
    performing, by a computer, a first selecting process comprising selecting a top list, corresponding to a top leaf of said left-deep AND-tree, from said group of lists to leave remaining lists of said group of lists, wherein said top list comprises a smallest list of said lists;
    estimating, by said computer, intersections of said remaining lists with said top list by estimating an amount of intersection between said remaining lists and said top list;
    performing, by said computer, a second selecting process comprising selecting a worst-case list from said remaining lists that has a smallest amount of intersection based on said estimating;
    intersecting, by said computer, said top list and said worst-case list;
    removing, by said computer, said worst-case list from said remaining lists to produce updated remaining lists;
    repeating, by said computer, said estimating, said performing of said second selecting process, said intersecting, and said removing using said updated remaining lists iteratively until all lists within said group of lists have been processed to produce a list of intersections; and
    outputting, by said computer, said list of intersections,
    wherein said performing of said second selecting process comprises ordering said remaining lists in a binary AND-tree.

12. The method according to claim 11, wherein said ordering of said remaining lists in said binary AND-tree comprises ordering said remaining lists such that leaves of said AND-binary tree represent said remaining lists, such that internal nodes of said AND-binary tree represent intersection operators, such that every right child is a leaf, and such that said binary tree represents a linear ordering of said remaining lists.

13. A computer-implemented method of ordering an intersecting of a group of lists into a left-deep AND-tree, said method comprising:
    performing, by a computer, a first selecting process comprising selecting a top list, corresponding to a top leaf of said left-deep AND-tree, from said group of lists to leave remaining lists of said group of lists, wherein said top list comprises a smallest list of said lists;
    estimating, by said computer, intersections of said remaining lists with said top list by estimating an amount of intersection between said remaining lists and said top list;
    performing, by said computer, a second selecting process comprising selecting a worst-case list from said remaining lists that has a smallest amount of intersection based on said estimating, wherein said performing of said second selecting process comprises ordering said remaining lists in a binary AND-tree;
    intersecting, by said computer, said top list and said worst-case list;
    removing, by said computer, said worst-case list from said remaining lists to produce updated remaining lists;
    repeating, by said computer, said estimating, said performing of said second selecting process, said intersecting, and said removing using said updated remaining lists iteratively until all lists within said group of lists have been processed to produce a list of intersections; and
    outputting, by said computer, said list of intersections.

14. The method according to claim 13, wherein said estimating of said intersections comprises sampling a portion of said remaining lists.

15. The method according to claim 13, wherein said ordering of said remaining lists in said binary AND-tree comprises ordering said remaining lists such that leaves of said binary AND-tree represent said remaining lists, such that internal nodes of said binary AND-tree represent intersection operators, such that every right child is a leaf, and such that said binary AND-tree represents a linear ordering of said remaining lists.

16. The method according to claim 13, further comprising identifying larger list pairs comprising smaller intersections sizes when compared to smaller list pairs comprising larger intersections sizes.

17. A program storage device readable by machine, tangibly embodying a program of instructions executable by the machine to perform a method of ordering an intersecting of a group of lists into a left-deep AND-tree, said method comprising:
    performing a first selecting process comprising selecting a top list, corresponding to a top leaf of said left-deep AND-tree, from said group of lists to leave remaining lists of said group of lists, wherein said top list comprises a smallest list of said lists;
    estimating intersections of said remaining lists with said top list by estimating an amount of intersection between said remaining lists and said top list;
    performing a second selecting process comprising selecting a worst-case list from said remaining lists that has a smallest amount of intersection based on said estimating, wherein said performing of said second selecting process comprises ordering said remaining lists in a binary AND-tree;
    intersecting said top list and said worst-case list;
    removing said worst-case list from said remaining lists to produce updated remaining lists;
    repeating said estimating, said performing of said second selecting process, said intersecting, and said removing using said updated remaining lists iteratively until all lists within said group of lists have been processed to produce a list of intersections; and
    outputting said list of intersections.

18. The program storage device according to claim 17, wherein said estimating of said intersections comprises sampling a portion of said remaining lists.

19. The program storage device according to claim 17, wherein said ordering of said remaining lists in said binary AND-tree comprises ordering said remaining lists such that leaves of said binary AND-tree represent said remaining lists, such that internal nodes of said binary AND-tree represent intersection operators, such that every right child is a leaf, and such that said binary AND-tree represents a linear ordering of said remaining lists.

20. The program storage device according to claim 17, further comprising identifying larger list pairs comprising smaller intersections sizes when compared to smaller list pairs comprising larger intersections sizes.

* * * * *